United States Patent [19]

Hiroki

[11] Patent Number: 4,619,301

[45] Date of Patent: Oct. 28, 1986

[54] SPIKE TIRE

[75] Inventor: Eizo Hiroki, Sapporo, Japan

[73] Assignee: Agency of Industrial Science and Technology, Tokyo, Japan

[21] Appl. No.: 642,689

[22] PCT Filed: Dec. 19, 1983

[86] PCT No.: PCT/JP83/00443
§ 371 Date: Aug. 13, 1984
§ 102(e) Date: Aug. 13, 1984

[87] PCT Pub. No.: WO84/02497
PCT Pub. Date: Jul. 5, 1984

[30] Foreign Application Priority Data

Dec. 23, 1982 [JP] Japan .................. 57-234308
Mar. 14, 1983 [JP] Japan .................. 58-042915
Mar. 29, 1983 [JP] Japan .................. 58-054665

[51] Int. Cl.[4] .................. B60C 11/14
[52] U.S. Cl. .................. 152/210; 152/160
[58] Field of Search .......... 152/210, 208, 169, 156, 152/246, 247, 222, 159, 160, 162–164; 301/51; 140/103; 267/182

[56] References Cited

U.S. PATENT DOCUMENTS 3,095,918  7/1963  Mike .................. 152/208
3,831,655  8/1974  Cantz .................. 152/210

FOREIGN PATENT DOCUMENTS 58-112809  7/1983  Japan .

Primary Examiner—Edward Kimlin
Assistant Examiner—Thomas Bokan
Attorney, Agent, or Firm—Oblon, Fisher, Spivak, McClelland & Maier

[57] ABSTRACT

A spike tire for a vehicle and which includes a pin receptacle hole formed on the tread surface of the tire; a spike pin retractably protrudable from the pin receptacle hole; a biasing mechanism for continuously urging the spike pin to protrude from the pin receptacle hole; and an actuating member of a shape memory alloy capable of restoring a memorized shape when warmed to a predetermined temperature by the heat generated in the tire as a result of operation of the vehicle on a non-frozen or snow-free road surface, to thereby retract the spike pin into said tire against the action of the biasing mechanism. The spike pin is automatically protruded and retracted depending upon road conditions based on a temperature difference between a frozen or snowed road surface and a non-frozen snow-free road surface. On a non-frozen bare road, the spike pin is automatically retracted into the pin receptacle hole by restoration of a memorized shape of the shape memory alloy thereby preventing damage and abrasive wear of road surfaces and the resulting generation of pollutional dust.

9 Claims, 9 Drawing Figures

SPIKE TIRE

BACKGROUND OF THE INVENTION

1. Field of the Invention

This invention relates to a spike tire to be used for securing safe travel of a vehicle on frozen and snowy roads.

2. Description of the Prior Art

In snowy cold districts, tire chains and spike tires are used to drive motor vehicles safely on frozen and snowy roads. In this connection, lately there is a trend that in most cases the spike tires which have spikes or anti-skid elements constantly projected on the surface of a tire tread are preferred to the chains which are fitted on tires only when road surfaces are frozen or snowed, because of the problems of putting on and taking off the chains.

However, partly because of recent development of snow removing techniques and partly because of increases in the amount of traffic, road surfaces are often exposed even after snowfalls, shortening the travel distances which need spike tires to a considerable degree. For instance, in Hokkaido, a northern district of Japan, it is assumed that the distance which requires spike tires is as small as 5% of the total travel distance.

If used on such non-frozen, snow-free roads, the conventional spike tires which have hard metal spike pins embedded in the tread faces give rise to problems such as damages and abrasive wear of road surfaces and pollution by the resulting dust. These problems occur commonly in cold snowy districts of various countries, and are generally dealt with by totally prohibiting the use of spike tires or restricting the use to a certain period. However, from a view point of safe travel of vehicles in snowy districts, the use of spike tires is very effective, and therefore it is desirable to solve the above-mentioned problems in a way to permit the use of spike tires on non-frozen bare roads.

SUMMARY OF THE INVENTION

It is an object of the present invention to provide a spike tire with spike pins which are automatically retractable into the tire on a non-frozen bare road according to a difference in temperature of the tire and spike pins on a frozen or snow-covered road and on a non-frozen bare road, thereby preventing the damage and abrasive wear of road surfaces as well as the generation of pollutional dust.

According to the present invention, there is provided a spike tire which is characterized by the provision of: a spike pin retractably fitted in a pin receptacle hole on the surface of a tire tread; biasing means constantly urging the spike pins radially outward into a protruded position; and an actuating member of a shape memory alloy capable of restoring a memorized shape against the action of the biasing means upon a temperature increase by the heat generated in the tire as a result of operation on a non-frozen bare road to thereby retract the spike pin into the tire.

With the above-described spike tire according to the present invention, the actuating member of a shape memory alloy is retained in an easily deformable plastic state on a frozen or snow-covered road by a temperature drop, the biasing means urging spike pins to protrude from the pin receptacle holes to ensure safe travel of a vehicle. On the other hand, when a vehicle is cruising on a non-frozen bare road, the biasing force of the biasing means is overcome by the restoring force of the shape memory alloy of the actuating members and the spike pins are automatically retracted into the pin receptacle holes to prevent damages and abrasive wear of road surfaces by the spikes and the resulting dust pollution.

The above and other objects, features and advantages of the invention will become apparent from the following description and appended claims, taken in conjunction with the accompanying drawings which show by way of example some preferred embodiments of the invention.

BRIEF DESCRIPTION OF THE DRAWINGS

In the accompanying drawings

DESCRIPTION OF PREFERRED EMBODIMENTS

Figure 1:
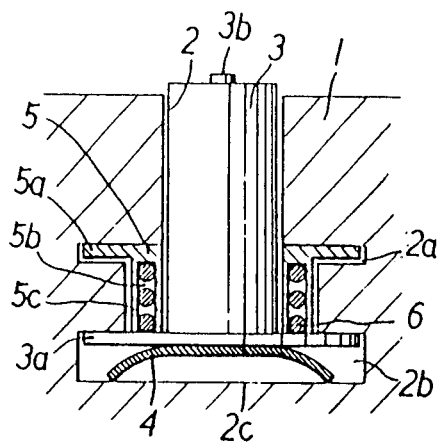
FIG. 1 is a fragmentary sectional view of a spike tire according to the present invention.
Figure 2:
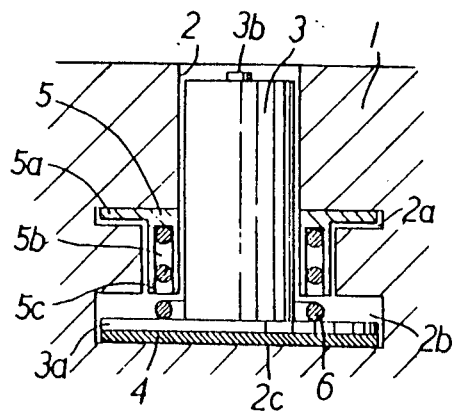
FIG. 2 is a view similar to FIG. 1 but showing a spike in a different position.

Referring to the accompanying drawings and first to FIGS. 1 and 2, there is shown a spike tire according to the present invention employing an actuating member consisting of a shape memory alloy of a coil form which is adapted to assume one of two different states of operation. Indicated at 1 is a tire proper and at 2 are pin receptacle holes provided on the tread surface of the tire 1, each pin receptacle hole 2 having large diameter portions 2a and 2b at its intermediate and bottom portions, respectively.

A spike pin 3 which is fitted in each receptacle hole 2 is provided with a flange portion 3a at its inner end to be fitted in the large diameter portion 2b of the receptacle hole 2, and its outer end is retractably protrudable from the receptacle hole 2. Interposed between the flange portion 3a of the spike pin 3 and a bottom surface 2c of the receptacle hole 2 is a dished spring 4 which serves as biasing means for constantly urging the spike pin 3 to protrude out of the receptacle hole 2. The actuating member 6 of a shape memory alloy of a coil form is interposed between the flange portion 3a of the spike pin and a stopper 5 which restricts the length of protrusion of the outer end portion 3b of the spike pin. The stopper 5 consists of a flange portion 5a to be fitted in the large diameter portion 2a of the receptacle hole 2 and a cylindrical portion 5c with an annular groove 5b for receiving therein the coil-like actuating member 6 of a shape memory alloy. Marginal edges at the inner open end of the annular groove 5b are abutted against the flange portion 3a of the spike pin to restrict the amount of its outward protrusion.

The shape memory actuating member 6 easily yields to an external force when in plastic state at temperatures below a transformation point at which the alloy restores a memorized shape. Namely, upon an increase in the temperature of the tire 1 or spike pin 3, the actuating member 6 which has been held in a deformed shape due to its plasticity restores a memorized shape, pushing the flange portion 3a of the spike pin toward the bottom surface 2c of the receptacle hole against the biasing force of the dished spring 4.

With regard to the shape memory alloy, there have been known various kinds of alloys of this sort and it is possible to set the temperature of restoration of a memorized shape arbitrarily by varying the alloy composition. The transformation temperature of the actuating member 6 which is formed of such a shape memory alloy is determined depending upon the type of the vehicle or climate conditions of districts in which the tire is to be used.

When the spike tires of the above-described construction are running on a frozen or snow-covered road surface, each actuating member 6 of a shape memory alloy is held in an easily deformable plastic state as shown in FIG. 1 due to a temperature drop, so that it is compressedly deformed by the biasing force of the dished spring 4. Accordingly, the flange portion 3a of the spike pin 3 is pushed radially outward by the dished spring 4 to hold the spike pin 3 in a protruded position on the tread surface of the tire 1.

On the other hand, when running on a non-frozen or snow-free road, the actuating member 6 of the shape memory alloy restores a memorized shape of a stretched coil as shown in FIG. 2 due to a temperature increase caused by the heat resulting from the cruising operation. Consequently, the flange portion 3a of the spike pin 3 is pressed toward the bottom surface 2c of the receptacle hole 2 to retract the spike pin 3 into the hole 2.

Figure 3:
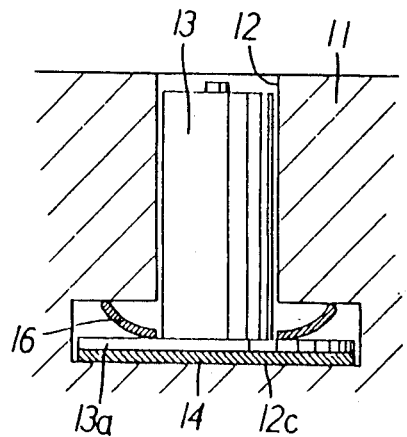
FIG. 3 is a fragmentary sectional view of a modification of the embodiment shown in FIG. 1.

FIG. 3 illustrates a modification which employs, instead of the actuating member 6 consisting of a coil-like shape memory alloy, an actuating member 16 of a dish-like shape memory alloy with a center aperture. In this figure, the actuating member 16 is shown in a restored state exhibiting a memorized concave shape. This actuating member 16 has an advantage that it contacts the flange portion 13a of the spike pin 13 over a broad area when plasticized and flattened by the biasing force of the dished spring 14, accelerating the heat transfer from the spike pin 13 to the actuating member 16 to ensure a quick action of the latter.

Although the dished spring 4 or 14 is interposed between the flange portion 3a or 13a of the spike pin 3 or 13 and the bottom surface 2c or 12c of the pin receptacle hole 2 or 12 in the foregoing embodiments, it is also possible to utilize a coil spring or the resilient restoring force of the tire rubber itself as the material of the tire 1 or 11. In the latter case, suitable resiliency can be obtained by providing a plurality of rubber projections on the bottom surface 2c or 12c of the pin receptacle hole.

Figure 4:
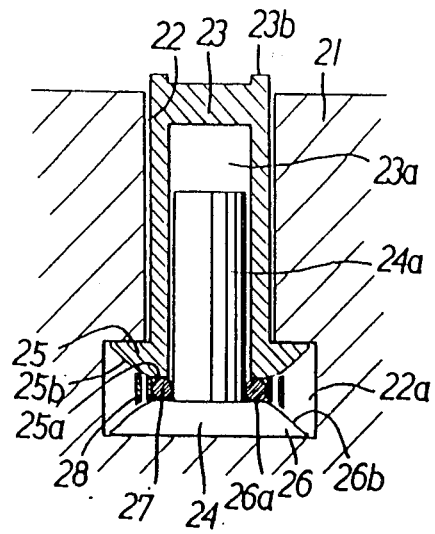
FIG. 4 is a fragmentary sectional view of another embodiment of the invention.
Figure 5:
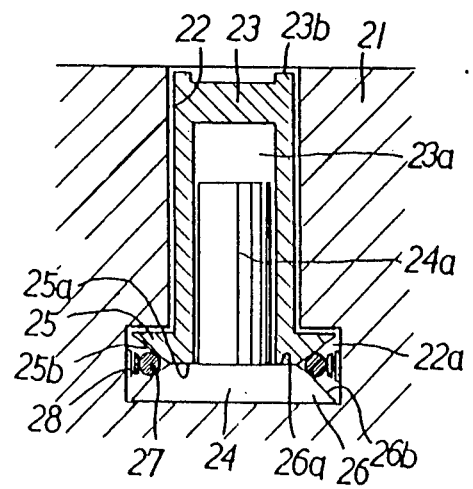
FIG. 5 is a view similar to FIG. 4 but showing a spike in a different position.

Referring to FIGS. 4 and 5, there is shown another embodiment of the present invention with spike pins in protruded and retracted positions, respectively, in which indicated at 21 is a tire body proper and at 22 are pin receptacle holes which are provided on the tread surface of the tire 21, each pin receptacle holes 22 being internally provided with a large diameter portion 22a.

Fitted in the pin receptacle hole 22 is a spike pin 23 having an internal guide hole 23a open at the inner end thereof and an outer end portion 23b which is retractable into the pin receptacle hole 22. A shank portion 24a of guide pin 24 which supports and guides the spike pin 23 is fitted in the internal guide hole 23a. The spike pin 23 and guide pin 24 are provided with flanges 25 and 26, respectively, which are opposingly received in the large diameter portion 22a of the pin receptacle hole 22. These flanges 25 and 26 are formed with opposing flat support surfaces 25a and 26a and tapered guide surfaces 25b and 26b which are diverged in V-shape around the support surfaces 25a and 26a.

Provided between the flanges 25 and 26 are a ring-like actuating member 27 of a shape memory alloy which is expansible to a memorized shape, i.e., a ring of an increased diameter which lies on the outer side of the support surfaces 25a and 26a (FIG. 5), and a spiral spring 28 which compressingly deforms and forcibly pushes the actuating member 27 into a position between the flat support surfaces 25a and 26a to protrude the spike pin 23 radially outward as soon as the actuating member 27 is plasticized.

The large diameter portion 22a of the receptacle hole 22 is spread in the axial direction of the spike pin by the flanges 25 and 26 against the resilient restoring force of rubber of the tire 1 itself as shown in FIG. 4 when the actuating member 27 is pushed inbetween the support surfaces 25a and 26a by the biasing force of the spring 28. Accordingly, when the actuating member 27 comes off the support surfaces 25a and 26a by restoration of the memorized shape as shown in FIG. 5, the resilient restoring force of the tire rubber acts on the flange 25 of the spike pin 23 to retract the same into the pin receptacle hole 22.

When the spike tires of the above-described construction are running on a frozen or snow-covered road, the shape memory alloy of the actuating member 27 is cooled into plastic state and compressedly deformed by the biasing force of the spring 28 as shown in FIG. 4, setting apart the flanges 25 and 26 against the resilient restoring force of the tire 1 and pushing in the actuating member 27 between the support surfaces 25a and 26a to retain the spike pin 23 in the protruded position. On the other hand, when running on a non-frozen or snow-free road, the temperature of the actuating member 27 is raised by the heat which is generated in the running tire, so that the actuating member 27 restores by itself the memorized shape of a larger diameter, disengaging from the support surfaces 25a and 26a as shown in FIG. 5. Consequently, the spike pin 23 is retracted into the receptacle hole 22 by the resilient restoring force of the tire 21 proper.

The sectional shape of the actuating member 27 is not limited to the circular shape shown, and may be formed in any other shape which is suitable for the above-described operation. Further, the spring 28 may be a coil spring, a leaf spring, a spiral spring or the like.

In this manner, the spike pin 23 is retained in the protruded state by pushing in the actuating member 27 of a shape memory alloy between the support surfaces 25a and 26a on the flanges 25 and 26 of the spike pin 23 and guide pin 24 securely even under a large load of a vehicle.

Figure 6:
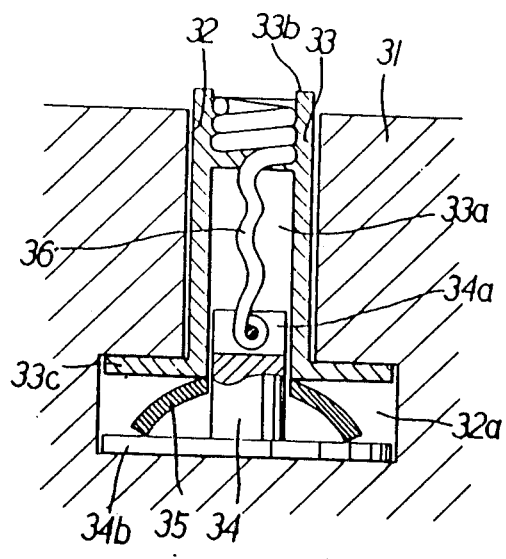
FIG. 6 is a fragmentary sectional view of a further embodiment of the invention.
Figure 7:
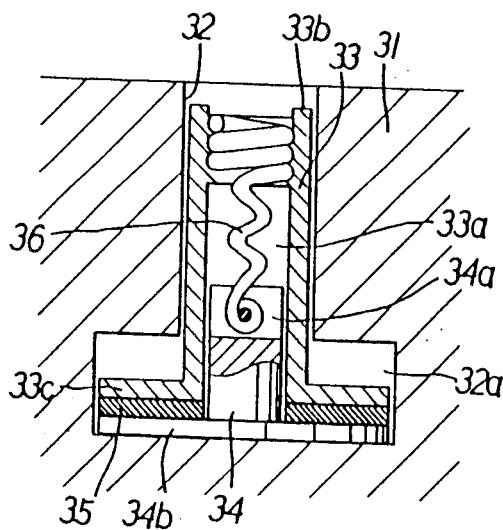
FIG. 7 is a view similar to FIG. 6 but showing a spike in a different position.

FIGS. 6 and 7 shows another embodiment of the invention, in which indicated at 31 is a tire proper and at 32 is a pin receptacle hole which is formed on the tread surface of the tire 1 and internally provided with a large diameter portion 32a.

Fitted in the pin receptacle hole 32 is a spike pin 33 having an internal bore 33a formed axially from the inner end thereof and an outer end portion 33b retractably protruded from the pin receptacle hole 32. The spike pin 33 is supported and guided by a guide pin 34 with a shank portion 34a fitted in the guide hole 33a. The spike pin 33 and guide pin 34 are provided with flanges 33c and 34b at the respective base ends, the flanges 33c and 34b being opposingly received in the large diameter portion 32a of the pin receptacle hole 32.

The shank 34a of the guide pin 34 is extended through a center aperture of a dished spring 35 which is interposed between the flange portions 33c and 34b to apply a biasing force on the spike pin 33 in a protruding direction. The biasing means which is constituted by the dished spring 35 may be replaced by a resilient member of a different type such as a leaf spring or a coil spring if desired.

The outer end 33b of the spike pin 33 is connected to the outer end of the shank portion 34a of the guide pin by a meandering or coiled actuating member 36 of a shape memory alloy. Part of the shape memory alloy is exposed to the outside at the outer end of the spike pin 33.

When the spike tires of the foregoing construction are running on a frozen or snow-covered road, the shape memory alloy of the actuating member 36 is cooled into plastic state so that the spike pin 33 is protruded from the surface of the tire 1 by the biasing force of the spring 35 as shown particularly in FIG. 6.

On the other hand, on a non-frozen or snow-free road, the shape memory alloy of the actuating member 36 is warmed by the heat which is generated in the tire as a result of the running operation of the vehicle, contracting into a memorized shape of a shorter length as shown in FIG. 7. Consequently, the spring 35 is compressed flat and the spike pin 33 is retracted into the pin receptacle hole 32 from the surface of the tire 1.

In this embodiment, the actuating member 36 is mounted in position in such a manner that part of the shape memory alloy is exposed on the surface at the outer end 33b of the spike pin 33, so that the heat transfer from a road surface to the actuating member can be accelerated to ensure a quick response to variations in the road condition.

Figure 8:
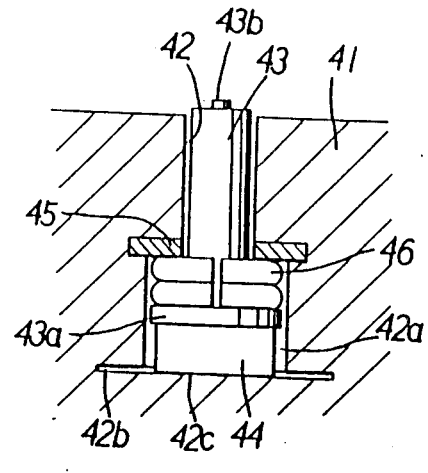
FIG. 8 is a fragmentary sectional view of still another embodiment of the invention.
Figure 9:
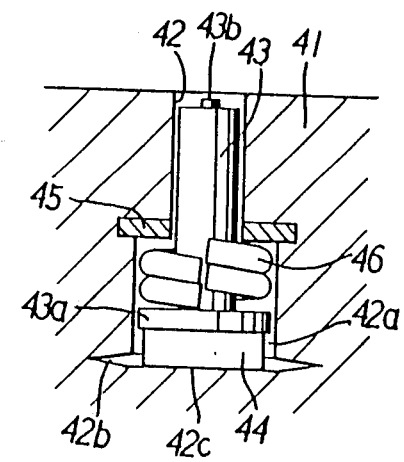
FIG. 9 is a view similar to FIG. 8 but showing a spike in a different position.

FIGS. 8 and 9 show still another embodiment of the invention, in which denoted at 41 is a tire proper and at 42 a pin receptacle hole which is provided on a tread surface of the tire 41. The pin receptacle hole 42 is provided with a large diameter portion 42a at the inner end thereof, and a notch 42b around its bottom surface 42c to facilitate elastic deformation of the tire rubber. Fitted in the pin receptacle hole 42 is a spike pin 43 having a flange portion 43a at its base or inner end opposite a retractably protruded outer end portion 43b. A resilient member 44 is interposed between the flange portion 43a and the bottom surface 42c of the pin receptacle hole 42 to urge the spike pin 43 radially outward. The resilient member 44 which constitutes a biasing means may be substituted by a rubber strip, dished spring, ring spring, resilient synthetic resin material or the like. Further, interposed between the flange portion 43a of the spike pin 43 and a stopper plate 45 fitted in abutting engagement with a stepped wall at the outer end of the large diameter portion of the pin receptacle hole 42 is an actuating member 46 consisting of a plurality of overlapped shape memory alloy members with a suitable memorized shape for setting apart the flange 43a and stopper plate 45.

The stopper plate 45 serves for increasing the contact area between the tire 41 and actuating member 46 and is in the form of a ring having a center aperture fitted on the spike pin 43. The shape memory alloy members 46 are formed in the shape of a coil having one or more helics and used in overlapped state to provide a compact construction with a doubled stress.

When running on a frozen or snow-covered road, the shape memory alloy of the actuating member 46 is cooled into plastic state and compressedly deformed by the action of the resilient member 44 to maintain the spike pin 43 in the protruded position as shown in FIG. 8. On the other hand, on a non-frozen or snow-free road, the shape memory alloy of the actuating member 46 is warmed by the heat which is generated in the rolling tire and restores the memorized shape as shown in FIG. 9, pressing the flange portion 43a of the spike pin 43 radially inward against the action of the resilient member 44 and the air pressure of the tire tube. As a result, the outer end portion 43b of the spike pin 43 is retracted into the pin receptacle hole 42 under the surface 42c of the tire 41. The notch 42b which is provided around the bottom surface 42c of the pin receptacle hole 42 facilitates the elastic deformation of the tire rubber.

The above-described retractable spike pin arrangement using an actuating member consisting of a number of coil-like wires with one or more helics permits to reduce the diameters of the wire and coil to obtain a given restoring force as compared with a case using a single coil spring for the actuating member, coupled with improvements in resistance to strain and fatigue. Accordingly, it becomes possible to obtain a spike tire smaller in size and which can endure hard friction and vibrations. It follows that a large number of spike pins can be driven into the surface of a tire to enhance braking characteristics on ice and snow.

With the spike tires of the above-described embodiments, it is necessary to protrude the spike pins rigidly from the tread surface of the tire when running on a frozen or snow-covered road, by a length sufficient for the spike pins to penetrate a frozen or snowed road surface. However, on a non-frozen or snow-free road, the spike pins are not necessarily required to be completely retracted into the pin receptacle holes. The object of the invention can also be attained by spike pins which are arranged to retract into the tire when depressed with a relatively weak force.

Tables 1 and 2 below show the results of experiments conducted by the inventor, in which the spike pins of the construction shown in FIGS. 8 and 9 were attached to automobile tires of a pneumatic pressure of 1.8 kg/cm$^2$ with a force of protrusion of 20 kg and actually run on roads of various conditions. In these tables, the length of pin protrusion is indicated by way of measure from the tire tread surface, the figures with positive and negative marks "+" and "−" showing the extent of protrusion and retraction from the outer surface of the tire tread, respectively.

TABLE 1

| Testing time (min) | 0 | 0–5 | 5 | 5–20 | 20 | 20–25 | 25 | 25–40 | 40 |
|---|---|---|---|---|---|---|---|---|---|
| Temp. (°C.) | 1 | | 1 | | 1 | | 1 | | 1 |

TABLE 1-continued

| Testing time (min) | 0 | 0-5 | 5 | 5-20 | 20 | 20-25 | 25 | 25-40 | 40 |
|---|---|---|---|---|---|---|---|---|---|
| Cloudy Road surface condition | | Pressed snow | | Pressed snow | | Paved | | Paved | |
| Road surface temp. (°C.) | | 0 | | 0 | | 1 | | 1 | |
| Vehicle speed (km/hr) | | 60 | | 60 | | 60 | | 60 | |
| Temp. in tire tread (°C.) | 3 | | 10 | | 12 | | 20 | | 30 |
| Temp. around s. pin (°C.) | 2 | | 6 | | 8 | | 23 | | 32 |
| Protrusion length (mm) | +1.5 | | +1.5 | | +1.5 | | +0.5 | | −0.1 |

TABLE 2

| Testing time (min) | 0 | 0-30 | 30 | 30-35 | 35 | 35-40 | 40 |
|---|---|---|---|---|---|---|---|
| Temp. (°C.) Cloudy | 1 | | 1 | | 1 | | 1 |
| Road surface condition | | Paved | | Pressed snow | | Pressed snow | |
| Road surface temp. (°C.) | 1 | 1 | | 0 | | 0 | |
| Vehicle speed (km/hr) | | 60 | | 60 | | 60 | |
| Temp. in tire tread (°C.) | 5 | | 31 | | 20 | | 18 |
| Temp. around s. pin (°C.) | 3 | | 33 | | 16 | | 11 |
| Protrusion length (mm) | +1.5 | | −0.1 | | +1.2 | | +1.5 |

What is claimed as new and desired to be secured by Letters Patent of the United States is:

1. A spike tire for a vehicle, said tire having a tread surface, comprising:
    a pin receptacle hole provided in said tread surface of said tire;
    a spike pin retractably protrudable from said pin receptacle hole;
    biasing means for constantly urging said spike pin to protrude from said pin receptacle hole; and
    shape memory alloy actuating means for automatically restoring a memorized shape when warmed to a predetermined temperature by the heat generated in said tire as a result of operation of said vehicle on a non-frozen or snow-free road surface and for automatically retracting said spike pin into said tire against the action of said biasing means.

2. A spike tire as set forth in claim 1, wherein said biasing means for constantly urging said spike pin in a protruding direction further comprises a dished spring.

3. A spike tire as set forth in claim 1, wherein said biasing means further comprises a coil spring.

4. A spike tire as set forth in claim 1, wherein said biasing means further comprises means for utilizing a resilient force of the tire material.

5. A spike tire as set forth in claim 1, wherein said actuating means further comprises a shape memory alloy of a coil form.

6. A spike tire as set forth in claim 1, wherein said actuating means further comprises a shape memory alloy of a dished form.

7. A spike tire as set forth in claim 1, further comprising a guide pin fitted in said pin receptacle hole for supporting and guiding said spike pin, a plurality of flanges provided on said spike and guide pins, and a plurality of flat support surfaces opposingly formed with respect to said flanges, said biasing means including means for constantly urging said actuating means into a position between said support surfaces, said actuating means disengaging from said support surfaces upon restoration of said memorized shape.

8. A spike tire as set forth in claim 1, further comprising a guide pin fitted in said pin receptacle hole for supporting and guiding said spike pin, said biasing means being located between said spike and guide pins for urging said spike pin in a protruding direction, and said guide pin being connected to said spike pin by said actuating means.

9. A spike tire as set forth in claim 8, wherein said actuating means further comprises an end portion of a shape memory alloy which is exposed at an outer end of said spike pin.

* * * * *